Carl H. Mueller,
Lutwin C. Rotter,
Rudy F. Schneller,
Inventors.
Koenig and Pope,
Attorneys.

United States Patent Office 2,818,476
Patented Dec. 31, 1957

2,818,476
VALVE

Carl H. Mueller, Pasadena Hills, Lutwin C. Rotter, Maplewood, and Rudy F. Schneller, O'Fallon, Mo., assignors to The McNeil Machine & Engineering Company, Akron, Ohio, a corporation of Ohio Original application August 30, 1954, Serial No. 452,828, now Patent No. 2,715,454, dated August 16, 1955. Divided and this application December 31, 1954, Serial No. 479,015

2 Claims. (Cl. 200—61.86)

This invention relates to valves, and more particularly to a control valve for use in a lubricating system for automotive vehicles such as is shown in our copending application entitled Lubricating System, Serial No. 452,828, filed August 30, 1954, issued as Patent No. 2,715,454, August 16, 1955, of which this application is a division.

Among the several objects of the invention may be noted the provision of a valve for use in a system of the type shown in the stated patent, the valve being settable to effect either automatic operation of the system in response to starting and stopping of the engine of the vehicle, or manual operation at will. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a longitudinal cross section of a control valve of this invention, showing by means of dotted lines a part of the valve projected into the plane of the drawing, and illustrating parts in so-called "manual position";

Corresponding reference characters indicate corresponding parts throughout the several views of the drawings.

Figure 1:
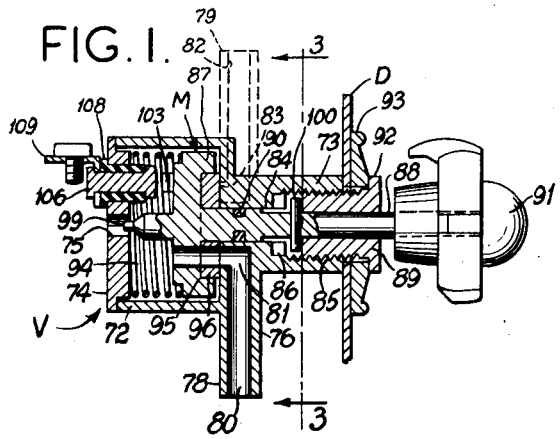
Figure 2:
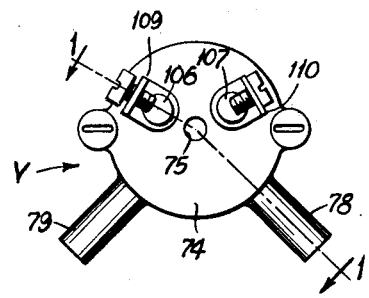
Fig. 2 is an end view of the control valve as viewed from the left of Fig. 1.

Referring to the drawings, a control valve V of this invention is shown to comprise a valve body 72 in the form of a cup with a cylindrical extension 73 from the base of the cup. The open side of the cup 72 is closed by a cover 74 having a central opening or port 75. The base of the cup is formed on the outside with integral radial bosses 76 and 77 and with integral nipples 78 and 79 in radial extension of the bosses. Nipple 78 and boss 76 have a bore 80 providing a passage to a port 81 opening to the inside of the cup through the base of the cup. Nipple 79 and boss 77 have a bore 82 providing a passage to a port 83 opening to the inside of the cup through the base of the cup. Ports 81 and 83 are located at the same distance from the valve axis and are angularly spaced 90°. The extension 73 and the base of the cup have an axial bore 84, and the extension has a counterbore 85 at its outer end. At the inner end of the counterbore 85 is a diametrical groove 86, spaced electrical contacts at said other end of the valve body, and means on the valve member for bridging said contacts upon axial movement of the valve member from its said second rotary position.

The valve V has a valve member generally designated M formed to provide a valve disk 87 rotary in the cup 72. This disk has a stem 88, shown as integral therewith, which extends through the bore 84 and through a tubular screw 89 threaded in the counterbore 85. Packing for the stem in bore 84 is shown at 90. On the outer end of the stem is a knob 91. The screw 89 is shown as extending through a hole in the dashboard D of the vehicle for drawing the end of extension 73 against the dashboard. The screw has an outwardly extending flange 92 engaging a ring 93 and clamping the ring against the dashboard. The stem 88 is axially slidable and rotary in the bore 84 and in the screw 89. A spring 94 is provided in the cup 72 for biasing the valve disk 87 toward engagement with the base of the cup. By pushing in on the knob 91, the disk may be moved axially away from the base of the cup. The disk is provided in the side toward the base of the cup with an annular recess 95. Valve member M includes a sealing ring 96 fixed in this recess 95. The ring 96 projects beyond the face of the disk for engagement with the base of the cup. It has an arcuate slot 97 on a radius corresponding to the radius of ports 81 and 83. The angular extent of this slot corresponds to the angular spacing of ports 81 and 83. The disk 87 and ring 96 have a hole 98 on the radius of the ports 81 and 83 angularly spaced 60° from one end of the slot 97. The disk 87 has an extension 99 projecting toward the cover 74 and adapted to close the port 75 in the cover when the disk is moved away from the base of the cup. Port 75 is a vent port.

Fixed in the stem 88, and located between the inner end of the screw 89 and the inner end of the counterbore 85, is a diametrical pin 100. In the rotary position of the stem 88 in which pin 100 is aligned with the groove 86 at the inner end of the counterbore 85 (see Fig. 5), the rotary position of the disk 87 is such that the hole 98 in the disk and ring 96 are aligned with port 81 in the base of the cup, and the slot 97 is in register with the port 83, otherwise being blocked (see Fig. 6). This position of the disk and stem is referred to as the "manual" position. It is determined by engagement of one end of a peripheral rib 101 on the disk with a stop 102 formed on the interior of the peripheral wall of the cup 72. When the disk is rotated 60° from the stated manual position in counterclockwise direction as viewed in Fig. 6 to the position shown in Fig. 4, the hole 98 moves out of register with port 81, and the arcuate slot 97 comes into position connecting ports 81 and 83. This position of the disk (and stem) is referred to as the "automatic" position. It is determined by engagement of the other end of the rib 101 with the stop 102. When the disk and stem are turned to the stated automatic position, pin 100 is moved out of register with the groove 86.

The disk 87 and stem 88 are made of electrical insulation material. On its side toward the cover 74, the disk carries an electrically conductive spring contact member 103 carrying spaced contacts 104 and 105. Fixed in the cover 74 are spaced contacts 106 and 107. These are insulated from the cover as indicated at 108 and have terminals 109 and 110. Contacts 104 and 105 on member 103 are adapted to engage contacts 106 and 107 when, with the disk and stem in manual position, the disk and stem are pushed inward against the bias of spring 94 from their axially outer position.

Reference is made to our stated Patent 2,715,454 for a disclosure of how the valve V is connected in the lubricating system.

Figure 3:
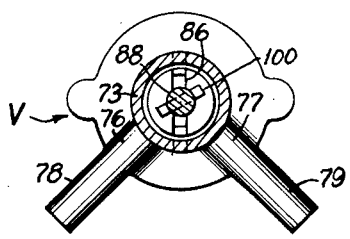
Fig. 3 is a transverse cross section taken on line 3—3 of Fig. 1, illustrating parts in so-called "automatic position"
Figure 4:
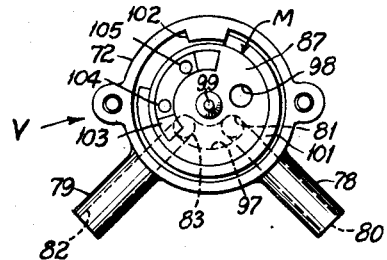
Fig. 4 is an end view of Fig. 1 as viewed from the left with a cover of the valve removed and showing parts in the automatic position.

Operation of the valve is as follows:

With the valve disk 87 and its stem 88 in the automatic position illustrated in Figs. 3 and 4, the valve disk is held by the spring 94 with the sealing ring 96 against the base of the cup 72, and the slot 97 in the sealing ring provides for communication between the valve passages 80 and 82. This provides for automatic operation of the lubricating system, as will be clear from our stated patent.

Figure 5:
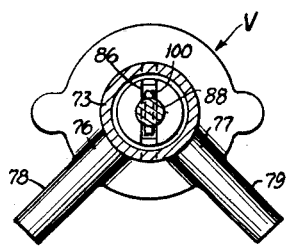
Fig. 5 is a view similar to Fig. 3 showing parts in the manual position.
Figure 6:
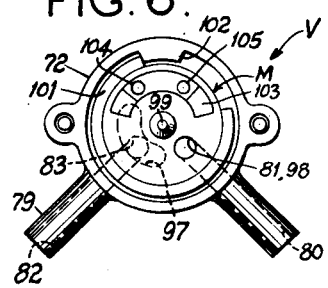
Fig. 6 is a view similar to Fig. 4 showing parts in the manual position.

For manual operation, the knob 91 of the control valve V is turned to rotate the valve disk 87 to the manual position shown in Figs. 5 and 6, wherein the pin 100 is aligned with the groove 86 so that the knob and valve stem 83 may be pushed inward. Then, the knob 91 may be pushed inward whenever desired to move the disk 87 and the sealing ring 96 axially away from the base of the cup 72. The extension 99 thereupon closes the port 75 in the cover 74, and passages 80 and 82 are placed in communication via the interior of the cup 72. This results in operation of the lubricating system, as will be clear from our stated patent.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A valve comprising a hollow valve body, a valve stem rotary and axially slidable in an opening in one end of the body, said end of the body having first and second angularly spaced ports, said valve body having a third port in its other end, a valve member on the end of the stem within the hollow body, said valve member having a recess adapted in a first rotary position of the valve member to establish communication between the first and second ports, said valve member also having a hole adapted in a second rotary position of the valve member to establish communication between said first port and the interior of the body, said second port being blocked by the valve member when in its stated second rotary position, said valve member being axially movable away from said one end of the body and adapted upon such movement to close the third port, said first and second ports when being placed in communication via the interior of the body, spaced electrical contacts at said other end of the valve body, and means on the valve member for bridging said contacts upon axial movement of the valve member from its said second rotary position.

2. A valve as set forth in claim 1, further comprising stop means on the stem engageable with the body for preventing axial movement of the valve member when in said first rotary position, and the body having a recess with which said stop means is aligned when the valve member is in its said second rotary position to permit axial movement of the valve member.

References Cited in the file of this patent

UNITED STATES PATENTS

| | | |
|---|---|---|
| 1,948,062 | Brunette | Feb. 20, 1934 |
| 2,331,109 | De Ganahl | Oct. 5, 1943 |
| 2,540,420 | Bordelon | Feb. 6, 1951 |
| 2,582,565 | Schnippel et al. | Jan. 15, 1952 |
| 2,630,325 | Reynolds | Mar. 3, 1953 |
| 2,679,560 | Kunzler et al. | May 25, 1954 |
| 2,715,454 | Mueller | Aug. 16, 1955 |

UNITED STATES PATENT OFFICE

CERTIFICATE OF CORRECTION

Patent No. 2,818,476 December 31, 1957

Carl H. Mueller et al.

It is hereby certified that error appears in the printed specification of the above numbered patent requiring correction and that the said Letters Patent should read as corrected below.

Column 1, line 71, beginning with ", spaced' strike out all to and including "rotary position" in column 2, line 2.

Signed and sealed this 18th day of February 1958.

(SEAL)
Attest:
KARL H. AXLINE
Attesting Officer

ROBERT C. WATSON
Commissioner of Patents